(12) United States Patent
Ren et al.

(10) Patent No.: US 11,284,128 B2
(45) Date of Patent: Mar. 22, 2022

(54) OBJECT POSITIONING METHOD, VIDEO DISPLAY METHOD, APPARATUS, DEVICE, AND STORAGE MEDIUM

(71) Applicant: GUANGZHOU HUYA INFORMATION TECHNOLOGY CO., LTD., Guangdong (CN)

(72) Inventors: Gaosheng Ren, Guangzhou (CN); Xiaodong Wu, Guangzhou (CN); Lu Liu, Guangzhou (CN)

(73) Assignee: GUANGZHOU HUYA INFORMATION TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/981,837

(22) PCT Filed: May 29, 2019

(86) PCT No.: PCT/CN2019/088921
§ 371 (c)(1),
(2) Date: Sep. 17, 2020

(87) PCT Pub. No.: WO2019/228387
PCT Pub. Date: Dec. 5, 2019

(65) Prior Publication Data
US 2021/0099737 A1      Apr. 1, 2021

(30) Foreign Application Priority Data

May 31, 2018   (CN) .......................... 201810548745.X

(51) Int. Cl.
*G06T 7/70*    (2017.01)
*H04N 21/234*  (2011.01)
(Continued)

(52) U.S. Cl.
CPC ... *H04N 21/23418* (2013.01); *G06K 9/00335* (2013.01); *G06K 9/00718* (2013.01);
(Continued)

(58) Field of Classification Search
CPC ............. H04N 21/23418; H04N 5/265; H04N 21/44008; H04N 5/268; H04N 21/44016;
(Continued)

(56) References Cited

U.S. PATENT DOCUMENTS

2014/0164483 A1   6/2014   Losev et al.
2015/0110455 A1   4/2015   Liu et al.
(Continued)

FOREIGN PATENT DOCUMENTS

CN    104159161 A    11/2014
CN    108053427 A    5/2015
(Continued)

OTHER PUBLICATIONS

Pairo, Wilma et al. "A Delay-Free and Robust Object Tracking Approach for Robotics Applications." Journal of Intelligent & Robotic Systems (2019): 1-19. (Year: 2019).*
(Continued)

*Primary Examiner* — John R Schnurr
(74) *Attorney, Agent, or Firm* — Schmeiser, Olsen & Watts, LLP

(57) ABSTRACT

Disclosed are an object positioning method, a video display method, an apparatus, a device, and a storage medium. The method includes: continuously intercepting a preset number of video frames in a video stream to be detected; detecting a first frame image in the intercepted video frames by a You Only Look Once (YOLO) object detection method to obtain a first positioning result corresponding to the first frame image; detecting each of other frame images in the intercepted video frames by a Kernel Correlation Filter (KCF)
(Continued)

object tracking method according to a positioning result corresponding to a frame image prior to the each of the other frame images to obtain respective second positioning results corresponding to the other frame images; and keeping on continuously intercepting the preset number of video frames in the video stream to be detected and obtaining corresponding positioning results until the video stream to be detected is finished.

14 Claims, 6 Drawing Sheets

(51) Int. Cl.
  *G06K 9/00* (2022.01)
  *G06K 9/62* (2022.01)
  *G06T 7/20* (2017.01)
  *H04N 5/265* (2006.01)
(52) U.S. Cl.
  CPC .............. *G06K 9/6217* (2013.01); *G06T 7/20* (2013.01); *G06T 7/70* (2017.01); *H04N 5/265* (2013.01); *G06T 2207/10016* (2013.01); *G06T 2207/20084* (2013.01); *G06T 2207/20221* (2013.01)
(58) Field of Classification Search
  CPC ... G06T 7/70; G06T 7/20; G06T 2207/10016; G06T 2207/20084; G06T 2207/20221; G06T 7/246; G06K 9/00335; G06K 9/00718; G06K 9/6217; G06K 9/4623; G06K 9/6271; G06K 9/6292; G06K 9/00355; G06K 9/00731
  See application file for complete search history.

(56) References Cited

U.S. PATENT DOCUMENTS

| | | | |
|---|---|---|---|
| 2018/0089515 | A1 | 3/2018 | Yang et al. |
| 2018/0089593 | A1 | 3/2018 | Patel et al. |
| 2019/0114804 | A1* | 4/2019 | Sundaresan .............. G06K 9/66 |
| 2019/0286930 | A1* | 9/2019 | Han .......................... G06T 7/11 |
| 2020/0380864 | A1* | 12/2020 | Yan .................... G06K 9/00771 |

FOREIGN PATENT DOCUMENTS

| | | |
|---|---|---|
| CN | 107563313 A | 1/2018 |
| CN | 107608345 A | 1/2018 |
| CN | 107918767 A | 4/2018 |
| CN | 108009473 A | 5/2018 |
| CN | 108062764 A | 5/2018 |
| WO | 2017/088050 A1 | 6/2017 |
| WO | 2018/055340 A1 | 3/2018 |

OTHER PUBLICATIONS

International Search Report dated Jul. 17, 2019 for PCT/CN2019/088921.

* cited by examiner

OBJECT POSITIONING METHOD, VIDEO DISPLAY METHOD, APPARATUS, DEVICE, AND STORAGE MEDIUM

CROSS-REFERENCES TO RELATED APPLICATIONS

This is a National Stage Application, filed under 35 U.S.C. 371, of International Patent Application No. PCT/CN2019/088921, filed on May 29, 2019, which claims priority to a Chinese patent application No. 201810548745.X filed on May 31, 2018, the entire contents both of which are incorporated herein by reference in their entireties.

FIELD OF TECHNOLOGY

The following relates to the technical field of image processing, for example, to an object positioning method, a video display method, an apparatus, a device, and a storage medium.

BACKGROUND

In order to make interaction between an anchor and users more effective and to detect unhealthy gestures of the anchor in a live video broadcast, it is necessary to continuously perform hand identification and tracking on live video.

In the related art, an object identification and tracking method for live video stream has a large amount of computation, which consumes a large amount of computational resources of a computation processing device. In addition, due to limited data computation capability of main chips applied to mobile terminals, running the existing object identification and tracking method for live video on the mobile terminals will seriously affect the normal use of the mobile terminals.

SUMMARY

An aspect relates to an object positioning method, a video display method, an apparatus, a device, and a storage medium, which optimize the existing object identification and tracking method for video stream.

In a first aspect, an embodiment of the present disclosure provides an object positioning method, which includes following steps.

A preset number of video frames in a video stream to be detected are continuously intercepted.

A first frame image in the intercepted video frames is detected by a You Only Look Once (YOLO) object detection method to obtain a first positioning result corresponding to the first frame image.

Each of other frame images in the intercepted video frames is detected by a Kernel Correlation Filter (KCF) object tracking method according to a positioning result corresponding to a frame image prior to the each of the other frame images to obtain respective second positioning results corresponding to the other frame images.

The preset number of video frames in the video stream to be detected are continuously intercepted to obtain corresponding positioning results until the video stream to be detected is finished.

In a second aspect, an embodiment of the present disclosure provides a video display method, which includes following steps.

A preset number of video frames in a video stream to be detected are continuously intercepted.

A first image to be identified corresponding to a first frame image is determined according to the first positioning result corresponding to the first frame image in the intercepted video frames obtained from the embodiments in the present disclosure.

It is determined whether the first image to be identified is a modifiable image.

A modified image matched with the first image to be identified is fused with the first frame image to form a first fusion image according to the first positioning result based on a determination result that the first image to be identified is a modifiable image.

Respective second images to be identified corresponding to other frame images are determined according to respective second positioning results corresponding to other frame images in the intercepted video frames obtained from the embodiments in the present disclosure.

It is determined whether the second images to be identified are the modifiable image.

Based on a determination result that the second images to be identified are the modifiable images, according to the second positioning results, the modified image matching the second images to be identified are fused with other frame images corresponding to the second images to be identified to form second fusion images.

The first fusion image, the second fusion images and the video frames which are not fused in the preset number of video frames are spliced according to the respective generation time of the preset number of video frames to generate a new video stream.

A video corresponding to the new video stream is represented to a user.

In a third aspect, an embodiment of the present disclosure provides an object positioning apparatus, which includes a first video frame intercepting module, a YOLO detection module, a KCF tracking module, and a second video frame intercepting module.

The first video frame intercepting module is configured to continuously intercept a preset number of video frames in a video stream to be detected.

The YOLO detection module is configured to detect a first frame image in the intercepted video frames by a YOLO object detection method to obtain a first positioning result corresponding to the first frame image.

The KCF tracking module is configured to detect each of other frame images in the intercepted video frames by a KCF object tracking method according to a positioning result corresponding to a frame image prior to the each of the other frame images to obtain respective second positioning results corresponding to the other frame images.

The second video frame intercepting module is configured to keep on continuously intercepting the preset number of video frames in the video stream to be detected and obtain corresponding positioning results until the video stream to be detected is finished.

In a fourth aspect, an embodiment of the present disclosure provides a video display apparatus, which includes a video frame obtaining module, a first to-be-identified image determination module, a first determination module, a first fusion image obtaining module, a second to-be-identified image determination module, a second determination module, a second fusion image obtaining module, a video splicing module, and a video stream representing module.

The video frame obtaining module is configured to continuously intercept a preset number of video frames in a video stream to be detected.

The first to-be-identified image determination module is configured to determine a first image to be identified corresponding to the first frame image according to the first positioning result corresponding to the first frame image in the intercepted video frames obtained from the above embodiments.

The first determination module is configured to determine whether the first image to be identified is a modifiable image.

The first fusion image obtaining module is configured to fuse a modified image matched with the first image to be identified and the first frame image to form a first fusion image according to the first positioning result based on a determination result that the first image to be identified is a modifiable image.

The second to-be-identified image determination module is configured to determine respective second images to be identified corresponding to the other frame images according to respective second positioning results corresponding to other frame images in the intercepted video frames obtained from the embodiments of the present disclosure.

The second determination module is configured to determine whether the second images to be identified are the modifiable images.

The second fusion image obtaining module is configured to fuse modified images matched with the second images to be identified and the other frame images corresponding to the second images to be identified to form second fusion images according to the second positioning results based on a determination result that the second images to be identified are modifiable images.

The video splicing module is configured to splice the first fusion image, the second fusion images, and the video frames which are not fused in the preset number of video frames according to the respective generation time of the preset number of video frames to generate a new video stream.

The video stream representing module is configured to represent a video corresponding to the new video stream to a user.

In a fifth aspect, an embodiment of the present disclosure provides a device, which includes one or more processors and a storage apparatus configured to store one or more programs; where when executed by the one or more processors, the one or more programs causes the one or more processors to implement the object positioning method described in the embodiments of the present disclosure.

In a sixth aspect, an embodiment of the present disclosure provides a storage medium containing computer-executable instructions; when executed by a computer processor, the computer-executable instructions are used to execute the object positioning method described in the embodiments of the present disclosure.

In a seventh aspect, an embodiment of the present disclosure provides a device, which includes one or more processors and a storage apparatus configured to store one or more programs; where when executed by the one or more processors, the one or more programs causes the one or more processors to implement the video display method described in the embodiments of the present disclosure.

In an eighth aspect, an embodiment of the present disclosure provides a storage medium containing computer-executable instructions; when executed by a computer processor, the computer-executable instructions are used to execute the video display method described in the embodiments of the present disclosure.

BRIEF DESCRIPTION

Some of the embodiments will be described in detail, with reference to the following figures, wherein like designations denote like members, wherein.

DETAILED DESCRIPTION

Figure 1:
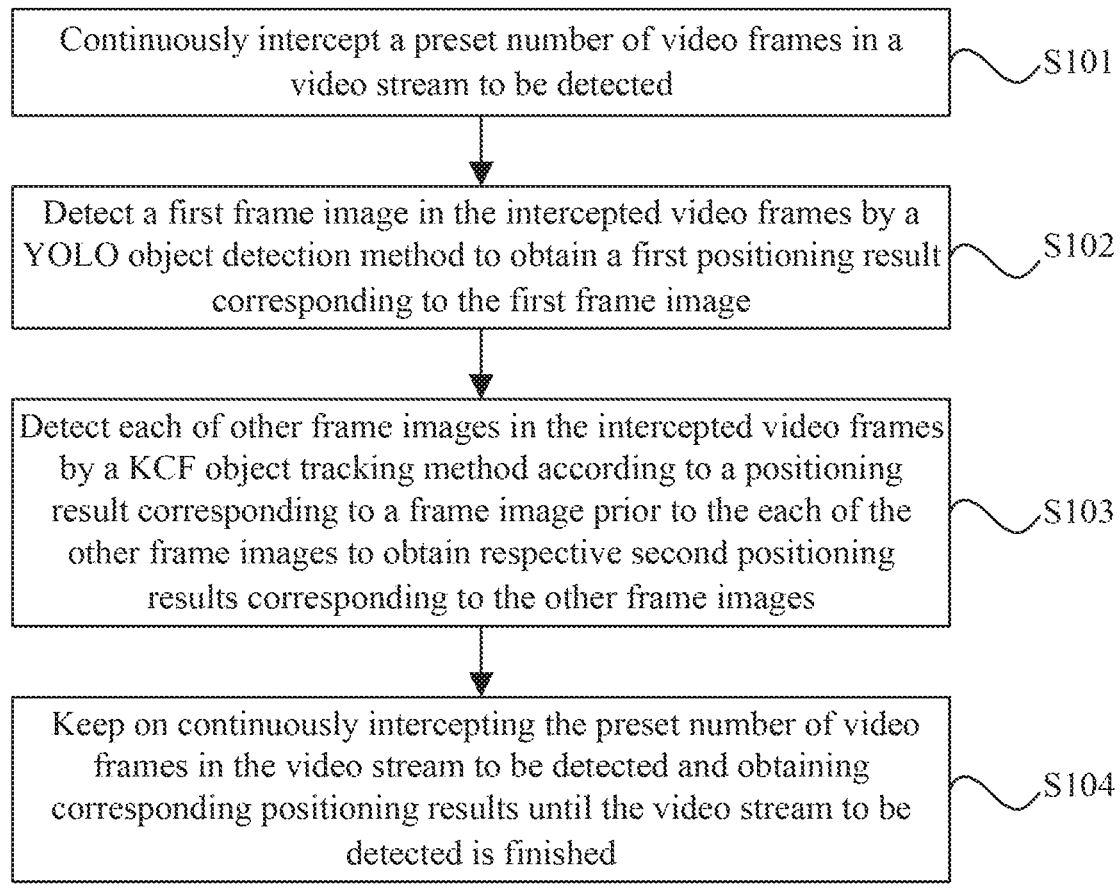
FIG. 1 is a flowchart of an object positioning method according to embodiment 1 of the present disclosure.

In order to illustrate the present disclosure, specific embodiments will be further described in detail in conjunction with the drawings. It is to be understood that the specific embodiments set forth below are intended to illustrate and not to limit the present disclosure.

Additionally, it is to be noted that, for convenience of description, only part, not all, of the contents related to the present disclosure are illustrated in the drawings. Before exemplary embodiments are discussed in more detailed, it is to be mentioned that some of the exemplary embodiments are described as processing or methods depicted in flowcharts. Although the operations (steps) in a flowchart are described as processing in sequence, many of the operations may be implemented in parallel, concurrently, or simultaneously. Additionally, the sequence of the operations may be rearranged. The processing may be terminated when the operations of the processing are completed, but additional steps not included in the drawings may further be provided. The processing may correspond to a method, a function, a procedure, a subroutine, a subprogram, etc.

Embodiment 1

FIG. 1 is a flowchart of an object positioning method according to embodiment 1 of the present disclosure. The method in the embodiment may be executed by an object positioning apparatus. The object position apparatus may be implemented by hardware and/or software, and may generally be integrated in a background server of a live broadcast system, or integrated in a mobile terminal. The method in the embodiment specifically includes the following steps.

In step 101, a preset number of video frames in a video stream to be detected are continuously intercepted.

In the embodiment, a starting interception position of the video frames may specifically be the first frame image of the video stream to be detected, or may be any frame image in the video stream to be detected. After the starting interception position of the video frames is determined, the video frames in the video stream are intercepted continuously, not at intervals.

In the embodiment, the preset number may be determined by parameters such as an image frame rate of the video stream to be detected and data processing capability of a current device. The current device refers to a device for performing the object positioning method including the steps 101 to 104 in the present embodiment, and may typically be a server or a mobile terminal.

Specifically, the higher data processing capability the current device has, the smaller the preset number could be. It can be understood that a YOLO object detection method requires a larger amount of computation than a KCF object tracking method. Therefore, when the object positioning method in the embodiment is implemented on images of a same number of frames, when the preset number is larger, the YOLO object detection method needs to be performed for less number of times, and thus the total computation amount is less; otherwise, when the preset number is smaller, the YOLO object detection method needs to be performed for more number of times, and thus the total computation amount is larger. Based on the above, if the data processing capability of the current device is higher, the preset number may be set to be relatively smaller, so as to improve the accuracy in identifying and tracking the object in the video as much as possible on the premise of not affecting the data processing efficiency of the current device.

In the embodiment, when the object positioning method in the embodiment is implemented on images of a certain number of frames, the less the preset number is set, it can be understood that the processing time for the certain number of frames may be longer. At this time, if the image frame rate of the video stream to be detected is high, frame drop may occur. Therefore, the image frame rate of the current video stream to be detected and the data processing capability of the current device should be comprehensively considered when the preset number is selected.

In step 102, a first frame image in the intercepted video frames is detected by the YOLO object detection method to obtain a first positioning result corresponding to the first frame image.

In the embodiment, the YOLO object detection method is used for object identification on the intercepted video frames. It can be understood that that the YOLO object detection method is to detect a set object of an image by a neural network (e.g., a convolutional neural network); the larger the number of layers of the neural network is, the more accurate the detection result is, while the longer the detection time is. Therefore, in the embodiment, the number of layers of the neural network used by the YOLO object detection method may be determined on the premise of comprehensive consideration of detection accuracy and detection time consumption.

In the embodiment, the first positioning result specifically refers to vertex coordinates of a position range of an object in the first frame image, which are determined by the YOLO object detection method. The vertex coordinates may be typically pixel coordinates and the like. Since the YOLO object detection method is described in the related art, it will not be described in detail here.

In step 103, each of other frame images in the intercepted video frames is detected by a KCF object tracking method according to a positioning result corresponding to a frame image prior to the each of the other frame images to obtain respective second positioning results corresponding to the other frame images.

In the embodiment, in the preset number of intercepted video frames, the positioning result of the first frame may be obtained by the YOLO object detection method, and the positioning results of other frames may be obtained by the KCF object tracking method.

For example, according to the first positioning result, the second frame image in the intercepted video frames is detected by the KCF object tracking method to obtain the second positioning result corresponding to the second frame image; according to the second positioning result corresponding to the second frame image, the third frame image in the intercepted video frames is detected by the KCF object tracking method to obtain the second positioning result corresponding to the third frame image; according to the second positioning result corresponding to the third frame image, the fourth frame image in the intercepted video frames is detected by the KCF object tracking method to obtain the second positioning result corresponding to the fourth frame image; and so forth, respective second positioning results corresponding to other frame images after the first frame image in the intercepted video frames may be obtained.

It should be noted that, in comparison with the adoption of the YOLO object detection method for each frame image, in the embodiment, under the condition that the required detection accuracy (the accuracy of the object positioning result may be adjusted by changing the preset number) is satisfied, when the object positioning is performed on the preset number of intercepted video frames, the object positioning result for the first frame image is obtained by using the YOLO object detection method, and the object positioning results for the other frames are obtained by using the KCF object tracking method, so that the amount of computation can be reduced as much as possible on the premise of not affecting the object positioning result, and thus the time required for computation can be reduced. This is because determining the position of the object in the image by the KCF object tracking method takes less time than determining the position of the object in the image by the YOLO object detection method. Since the KCF object tracking method is described in the related art, it will not be described in detail here.

In step 104, the preset number of video frames in the video stream to be detected are continuously intercepted to obtain corresponding positioning results until the video stream to be detected is finished.

In the embodiment, after the object positioning results corresponding to the preset number of intercepted video frames are obtained, the preset number of video frames are continuously obtained again from the video stream to be detected (from the first frame image after the last frame image intercepted last time), so as to continuously identify and track the object in the video stream to be detected until the video stream to be detected is finished.

The embodiment of the present disclosure provides an object positioning method, which includes the steps of firstly obtaining a positioning result of a first intercepted frame image by the YOLO object detection method, then obtaining positioning results of other intercepted frame images by the KCF object tracking method, and carrying out object identification and tracking on a video stream according to the positioning results. Since the determination of the position of the object in the image by the KCF object tracking method has less computation amount and time consumption than the determination of the position of the object in the image by the YOLO object detection method, compared with the adoption of the YOLO object detection method for each frame image, the embodiment solves the defects of large computation amount and time consumption of the object identification and tracking method for video stream in the related art without affecting the positioning result of the object, achieves fast and accurate object identification and tracking of the video stream, and greatly reduces the computation amount and time consumption of object identification and tracking of the video stream. When the number of layers of the neural network used by the YOLO object detection method is sufficiently small, the object detection method in the embodiment may be implemented on the mobile terminal, which fills the gap in the related art that there is no object identification and tracking of video streams applicable to mobile terminal.

Embodiment 2

Figure 2:
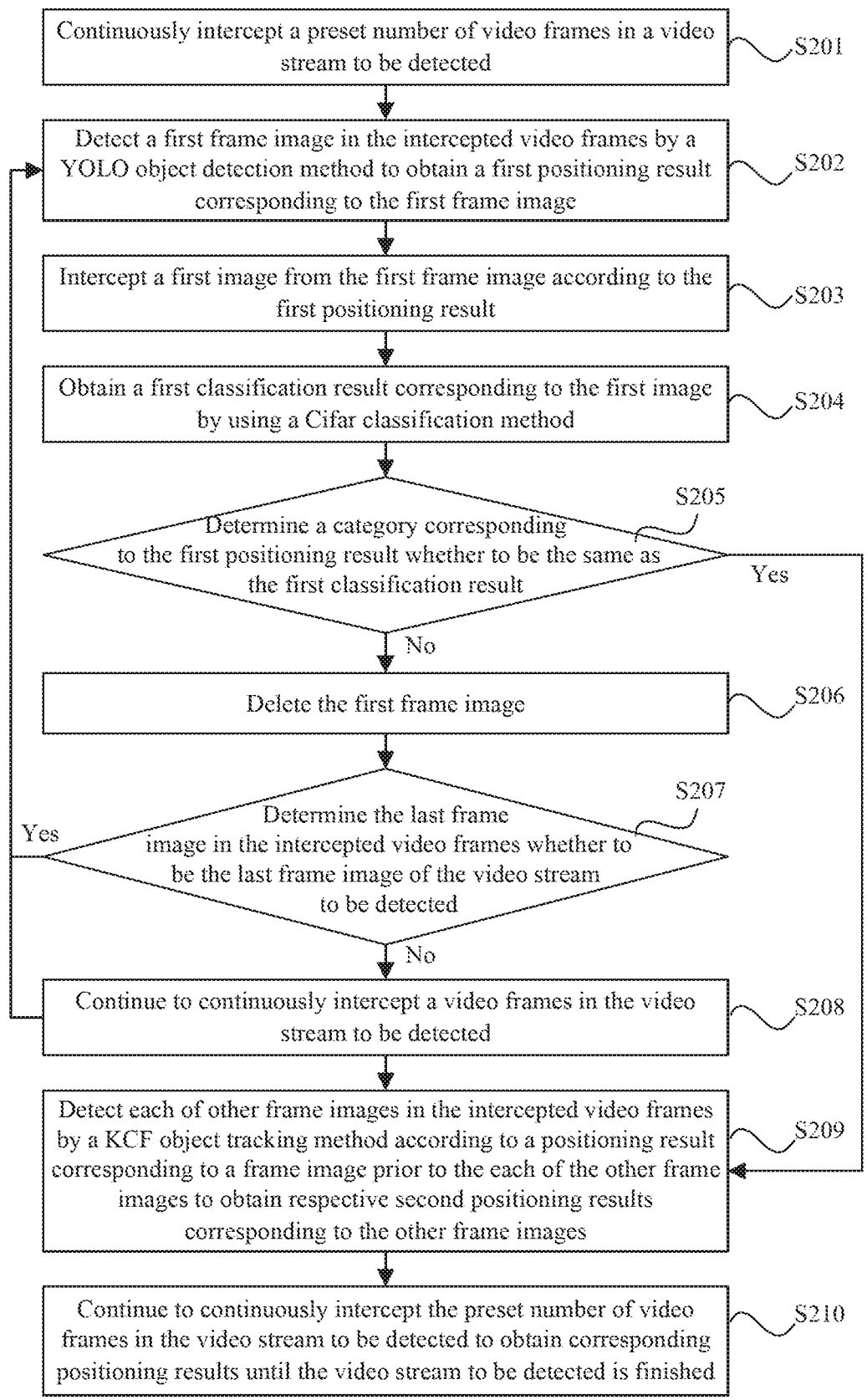
FIG. 2 is a flowchart of an object positioning method according to embodiment 2 of the present disclosure.

FIG. 2 is a flowchart of an object positioning method according to embodiment 2 of the present disclosure. The embodiment is a modification based on the above-mentioned embodiment. In the embodiment, an implementation mode is provided that adds a process of checking a first positioning result corresponding to a first frame image by a Cifar classification method.

Accordingly, the method of the embodiment includes the following steps.

In step 201, a preset number of video frames in a video stream to be detected are continuously intercepted.

In step 202, a first frame image in the intercepted video frames is detected by the YOLO object detection method to obtain a first positioning result corresponding to the first frame image.

In step 203, a first image is intercepted from the first frame image according to the first positioning result.

It can be understood that the detection result of the YOLO object detection method includes not only the positioning result of the object, but also a type of the object corresponding to the positioning result (that is, a category of the object corresponding to the positioning result). Therefore, in the embodiment, in order to improve the accuracy of object identification and tracking, after the first positioning result is obtained, the first positioning result is also checked by the Cifar classification method.

It should be noted that the category of the object corresponding to the positioning result may include, for example, non-gesture, gesture 1, gesture 2, gesture 3, and so on.

In the embodiment, steps 203 to 209 are the process of checking the first positioning result. First, an image corresponding to the first positioning result needs to be obtained; that is, a position range of a desired image in the first frame image is determined according to the first positioning result, and then an image, i.e., a first image, corresponding to the position range is obtained.

In step 204, a first classification result corresponding to the first image is obtained by using a Cifar classification method.

In the embodiment, after the first image is obtained, the category of the first image, i.e., the first classification result, is determined by the Cifar classification method. Since the Cifar classification method is described in the related art, it will not be described in detail here.

In step 205, it is determined whether a category corresponding to the first positioning result is the same as the first classification result; based on a determination result that the category corresponding to the first positioning result is different from the first classification result, the process executes step 206, and based on a determination result that the category corresponding to the first positioning result is the same as the first classification result, the process executes step 209.

It should be noted that the category corresponding to the first positioning result may include, for example, non-gesture, gesture 1, gesture 2, gesture 3, and so on. Correspondingly, the first classification result may also include: non-gesture, gesture 1, gesture 2, gesture 3, and so on.

In step 206, the first frame image is deleted.

In the embodiment, when the category corresponding to the first positioning result is different from the first classification result, it is determined that the first positioning result is incorrect. At this time, the first frame image is directly deleted, and the YOLO object detection method is not reused for the first frame image.

It can be understood that the video stream is generally continuous, and the content of the video stream is constantly updated. If the object detection is repeated multiple times for a frame image, more time will be occupied. Due to the limited buffer space of the current device, a frame drop phenomenon may occur. Therefore, in the embodiment, in order to minimize the occurrence of frame drop, when the first positioning result obtained by using the YOLO object detection method for the first frame image is inaccurate, the frame image is deleted immediately, and no extra time is wasted for re-detection.

In step 207, it is determined whether the last frame image in the intercepted video frames is the last frame image of the video stream to be detected; based on the determination result that the last frame image in the intercepted video frames is the last frame image of the video stream to be detected, the process returns to step 202; and based on the determination result that the last frame image in the intercepted video frames is not the last frame image of the video stream to be detected, the process executes step 208.

In the embodiment, after one frame image is deleted from the intercepted video frame, another frame image needs to be obtained from the video stream to be detected, so that the number of intercepted video frames is always maintained at the preset number. However, when the last frame of the intercepted video frames is the last frame of the video stream to be detected, no new video frame can be intercepted.

Therefore, in the embodiment, after the first frame image is deleted, it is determined first whether the last frame of the intercepted video frames is the last frame of the video stream to be detected; when it is determined that the last frame image in the intercepted video frames is the last image in the video stream to be detected, no image can be intercepted any more, and only the second frame image in the intercepted images may be continuously processed until all the intercepted video frames are processed.

In step 208, a video frame from the video stream to be detected is continuously intercepted, and the process returns to execute step 202.

In the embodiment, when it is determined that the last frame image in the intercepted video frame is not the last frame image in the video stream to be detected, a video frame will be continuously intercepted from the video stream to be detected, that is, a first frame image after the last frame image in the intercepted video frames is intercepted from the video stream to be detected. After a new frame image is intercepted, the process returns to step 202 to obtain the first positioning result corresponding to the first frame image in the currently intercepted video frames.

In step 209, each of other frame images in the intercepted video frames is detected by a KCF object tracking method according to a positioning result corresponding to a frame image prior to the each of the other frame images to obtain respective second positioning results corresponding to the other frame images.

In step 210, the preset number of video frames in the video stream to be detected are continuously intercepted to obtain corresponding positioning results until the video stream to be detected is finished.

The embodiment of the present disclosure provides an object positioning method, specifically adds a process of checking the first positioning result corresponding to the first frame image by the Cifar classification method, and thereby improves the accuracy of object identification and tracking of the video stream. In addition, the Cifar classification method has small computation amount, so that the accuracy is improved while the time consumption of the object positioning process is not affected significantly.

Based on the above embodiments, the neural network used by the YOLO object detection method is embodied as a 5-layer neural network.

It should be noted that, too few layers of the neural network may result in inaccurate detection results, while too many layers of the neural network may result in too large computation amount and too large time consumption, thereby making the object positioning method difficult to be applied to the mobile terminal. In the present embodiment, the neural network used by the YOLO object detection method is a 5-layer neural network, and the advantage of this setting is that: the object positioning method in the embodiment can be applied to the mobile terminal while the accuracy of the detection result is considered.

Embodiment 3

Figure 3:
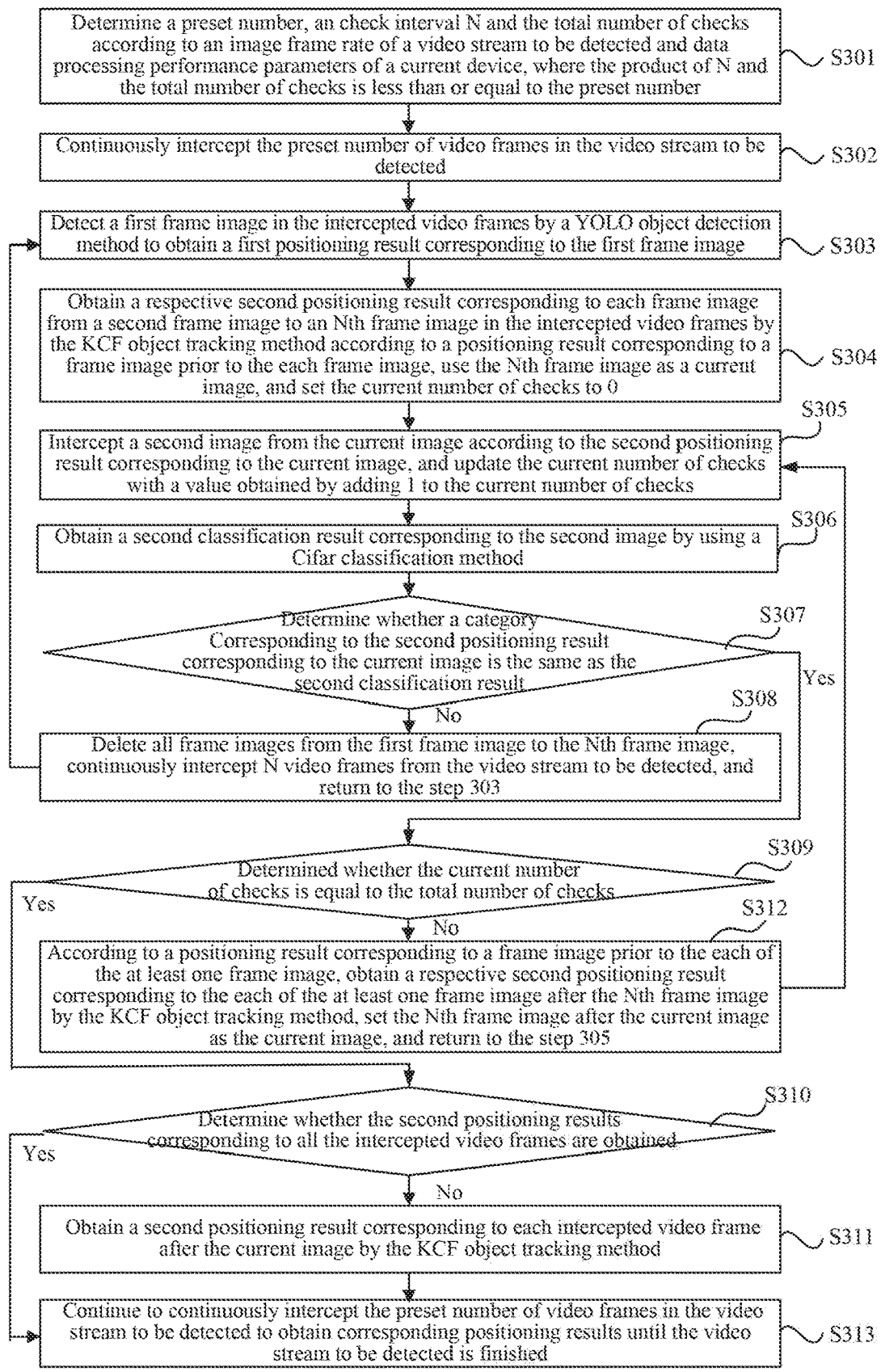
FIG. 3 is a flowchart of an object positioning method according to embodiment 3 of the present disclosure.

FIG. 3 is a flowchart of an object positioning method according to embodiment 3 of the present disclosure. The present embodiment is based on the above embodiments. In the embodiment, a specific implementation mode is provided, in which a process of obtaining preset data is added, the above process is specified, a check interval and a total number of checks are obtained at the same time, the process of obtaining the second positioning result is embodied, and the step of checking the second positioning result by the Cifar classification method is added to the process of obtaining the second positioning result.

Accordingly, the method of the present embodiment includes the following steps.

In step 301, the preset number, the check interval N (in the following steps of the embodiment, the check interval is denoted by N) and the total number of checks are determined according to an image frame rate of the video stream to be detected and the data processing performance parameters of the current device, where the product of N and the total number of checks is less than or equal to the preset number.

In the embodiment, the check interval specifically refers to a value obtained by adding 1 to the number of image frames serving as the interval between the video frame image of the last check and the video frame image of the current check. The total number of checks specifically refers to the number of images that need to be checked except for the first frame image of the preset number of intercepted video frames.

In the embodiment, the check interval and the total number of checks are also determined by the image frame rate of the video stream to be checked and the data processing performance parameters of the current device. It can be understood that the more times the second positioning results are checked, the more time it takes to complete the object positioning method in the present embodiment, and the greater the amount of computation is. Therefore, if the data processing performance of the current device is good and the image frame rate of the video stream to be detected is not very high, the check interval may be set relatively small, and the total number of checks may be set relatively large; if the data processing performance of the current device is average or the image frame rate of the video stream to be detected is high, it is not advisable to set the total number of checks too large. Otherwise, frame drop can easily occur, and the check interval should be set relatively large.

In step 302, a preset number of video frames in a video stream to be detected are continuously intercepted.

In step 303, a first frame image in the intercepted video frames is detected by the YOLO object detection method to obtain a first positioning result corresponding to the first frame image.

In step 304, a respective second positioning result corresponding to each frame image from a second frame image to an Nth frame image in the intercepted video frames is obtained by the KCF object tracking method according to a positioning result corresponding to a frame image prior to the each frame image, the Nth frame image is used as a current image, and a current number of checks is set to 0.

In the embodiment, the second positioning results corresponding to all frames except the first frame in the intercepted video frames are not obtained at once, but only the second positioning results corresponding to the second frame image to the Nth frame image in the intercepted video frames are obtained first, and thus unnecessary computation amount can be reduced.

Exemplarily, if N is 10, after the first positioning result corresponding to the first frame image is obtained, only the second positioning results corresponding to all frame images in the second to tenth frame images are obtained first.

In step 305, a second image is intercepted from the current image according to the second positioning result corresponding to the current image, and the current number of checks is updated with a value obtained by adding 1 to the current number of checks.

In the embodiment, while the second image is obtained, the value of the current number of checks is also increased by 1, which represents a start of a process of checking a new second positioning result.

It should be further noted that, when the preset number is smaller, only the second positioning results corresponding to other frame images in the intercepted video frames except the first frame may be checked once; for example, the total number of checks is 1, and only one second positioning result is checked. In such arrangement, the accuracy of object tracking may be improved without excessively increasing the amount of computation or excessively increasing the time computation.

In step 306, a second classification result corresponding to the second image is obtained by using a Cifar classification method.

In step 307, it is determined whether a category corresponding to the second positioning result corresponding to the current image is the same as the second classification result; if not, step 308 is executed; and if yes, step 309 is executed.

It should be noted that the category corresponding to the second positioning result may include, for example, non-gesture, gesture 1, gesture 2, gesture 3, and so on. Correspondingly, the second classification result may also include: non-gesture, gesture 1, gesture 2, gesture 3, and so on.

In step 308, all frame images from the first frame image to the Nth frame image are deleted, and N video frames from the video stream to be detected are continuously intercepted, and the process returns to step 303.

In the embodiment, if the category corresponding to the second positioning result corresponding to the current image is different from the second classification result, it is determined that the first positioning result and all the obtained second positioning results are incorrect, all frame images from the first frame image to the Nth frame image are directly deleted from the intercepted video frames, and positioning will not be performed on the first frame image to the Nth frame image again, which prevents the frame drop phenomenon of the video stream in the detection process.

In an embodiment, after all frame images from the first frame image to the Nth frame image are deleted, N video frames will continue to be intercepted from the video stream to be detected, that is, the interception starts from the first frame image after the last frame in the intercepted video frames. After the interception of video frames is completed this time, the process returns to step 303 to perform positioning and checking on the intercepted video frames again.

In step 309, it is determined whether the current number of checks is equal to the total number of checks; if yes, step 310 is executed; and if not, step 312 is executed.

In the embodiment, when the category corresponding to the second positioning result corresponding to the current image is the same as the second classification result, it is necessary to continue to determine whether the current number of checks is equal to the total number of checks, that is, it is necessary to determine whether the check of all the image frames to be checked in the intercepted video frames is completed.

In step 310, it is determined whether the second positioning results corresponding to all the intercepted video frames are obtained; if yes, step 313 is executed; if not, step 313 is executed.

In the embodiment, when the current number of checks is equal to the total number of checks, it is necessary to continue to determine whether the second positioning results corresponding to all the intercepted video frames have been obtained. It can be understood that if the product of N and the total number of checks is less than the preset number, then when the number of checks is equal to the total number of checks, a portion of the intercepted video frame images may not obtain corresponding second positioning results. Therefore, the determination process in this step is also required.

In step 311, a second positioning result corresponding to each intercepted video frame after the current image is obtained by the KCF object tracking method.

For example, according to the first positioning result, the second positioning result corresponding to the second frame image in the intercepted video frames may be obtained by the KCF object tracking method; according to the second positioning result corresponding to the second frame image in the intercepted video frames, the second positioning result corresponding to the third frame image in the intercepted video frames may be obtained by the KCF object tracking method; according to the second positioning result corresponding to the third frame image in the intercepted video frames, the second positioning result corresponding to the fourth frame image in the intercepted video frames may be obtained by the KCF object tracking method; and so forth, respective second positioning results corresponding to all intercepted video frames after the current image may be obtained.

In step 312, according to a positioning result corresponding to a frame image prior to the each of the at least one frame image, a respective second positioning result corresponding to the each of the at least one frame image after the Nth frame image is obtained by the KCF object tracking method, the Nth frame image after the current image is set as the current image, and the process returns to step 305.

In the embodiment, when the current number of checks is less than the total number of checks, it is determined that the check needs to be performed again. At this time, the second positioning results corresponding to the video frame images to be checked need to be obtained by the KCF object tracking method, that is, respective second positioning results corresponding to the N intercepted video frames after the current image are obtained, and then the process returns to step 305 to check again.

In step 313, the preset number of video frames in the video stream to be detected are continuously intercepted to obtain corresponding positioning results until the video stream to be detected is finished.

The embodiment of the present disclosure provides an object positioning method, in which the process of obtaining preset data is added, the process of obtaining the preset data is embodied, the check interval and the total number of checks are obtained at the same time to realize effective check of the second positioning result, the process of obtaining the second positioning result is embodied, the step of checking the second positioning result by a Cifar classification method added in the process of obtaining the second positioning result, and the accuracy of object identification and tracking of a video stream is increased. In addition, the Cifar classification method has small computation amount, so that the accuracy is improved while the time consumption of the object positioning process is not affected significantly.

Embodiment 4

Figure 4:
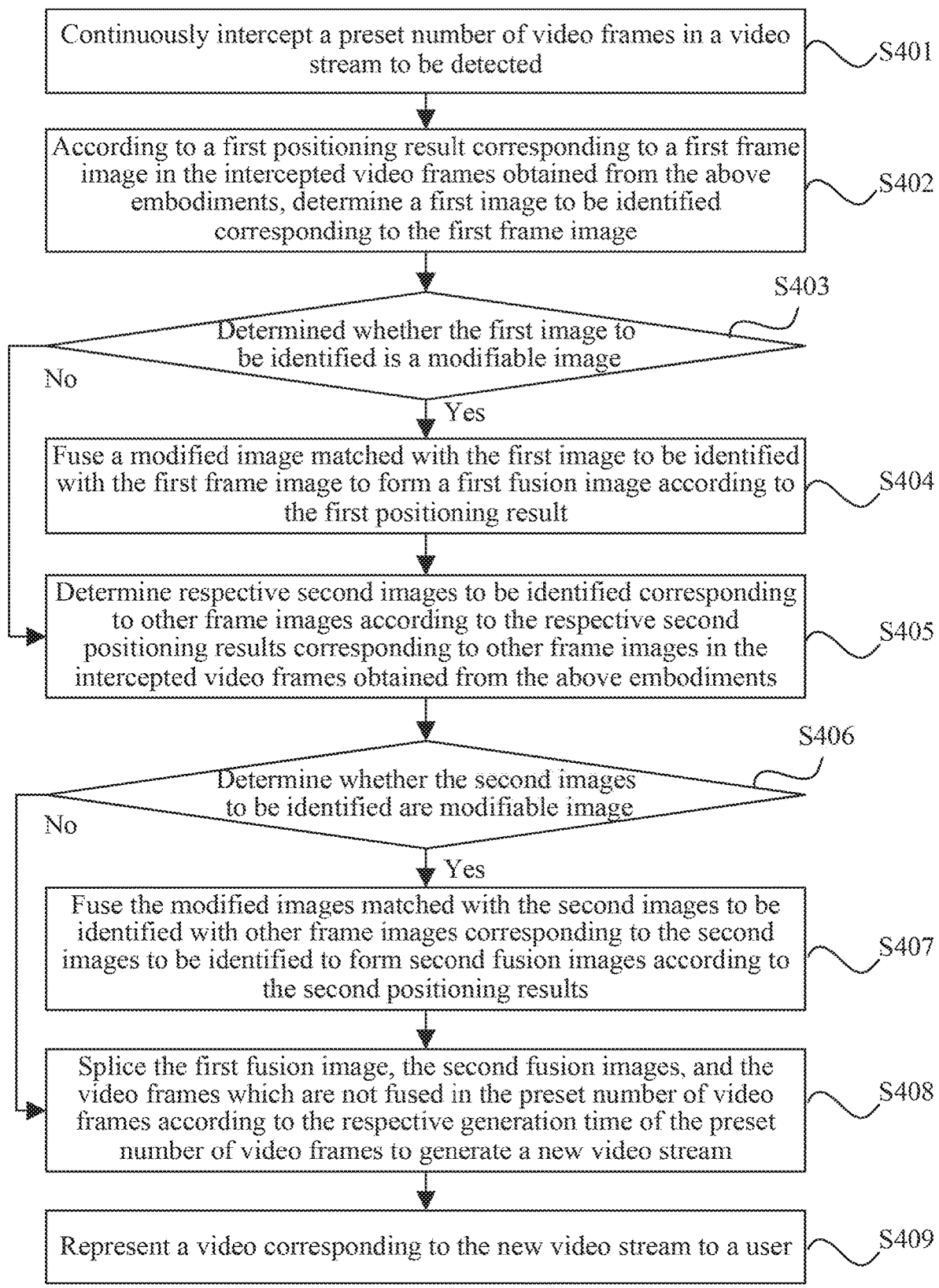
FIG. 4 is a flowchart of a video display method according to embodiment 4 of the present disclosure.

FIG. 4 is a flowchart of a video display method according to embodiment 4 of the present disclosure. The method in the embodiment may be executed by a video display apparatus. The video display apparatus may be implemented by hardware and/or software, and may generally be integrated in a background server of a live broadcast system, or integrated in a mobile terminal. The method of the embodiment specifically includes the following steps.

In step 401, a preset number of video frames in a video stream to be detected are continuously intercepted.

In step 402, a first image to be identified corresponding to a first frame image is determined according to the first positioning result corresponding to the first frame image in the intercepted video frames obtained from the above embodiments.

In the embodiment, a modifiable image is searched for by using the first positioning result and the second positioning result obtained in the above embodiments, and the found modifiable image is modified.

In the embodiment, the first image to be identified specifically refers to image content in the first frame image identified by the first positioning result.

In step 403, it is determined whether the first image to be identified is a modifiable image; if yes, step 404 is executed; if not, step 405 is executed.

In the embodiment, the modifiable image may specifically be a heart-shaped gesture image, a specific dance action image, and so on.

In step 404, according to the first positioning result, a modified image matching the first image to be identified is fused with the first frame image to form a first fusion image.

In the embodiment, fusing the modified image matched with the first image to be identified and the first frame image specifically means merging the modified image matched with the first image to be identified and the first frame image according to the first positioning result, and setting the modified image matched with the first image to be identified as a top layer image.

Exemplarily, when the first image to be identified includes a heart-shaped gesture image and the matching decoration image is a red heart-shaped, the red heart-shaped may be merged with the first image to be identified and be placed in the heart-shaped gesture to form a color-filled heart-shaped gesture.

In step 405, respective second images to be identified corresponding to other frame images are determined according to the respective second positioning results corresponding to other frame images in the intercepted video frames obtained from the above embodiments.

For example, according to the first positioning result, the second positioning result corresponding to the second frame image in the intercepted video frames may be obtained by the KCF object tracking method; according to the second positioning result corresponding to the second frame image in the intercepted video frames, the second positioning result corresponding to the third frame image in the intercepted video frames may be obtained by the KCF object tracking method; according to the second positioning result corresponding to the third frame image in the intercepted video frames, the second positioning result corresponding to the fourth frame image in the intercepted video frames may be obtained by the KCF object tracking method; and so forth, respective second images to be identified corresponding to all other frame image after the first frame image in the intercepted video frame are obtained.

In step 406, it is determined whether the second images to be identified are modifiable images; if yes, step 407 is executed; if not, step 408 is executed.

In step 407, according to the second positioning results, the modified images matched with the second images to be identified are fused with other frame images corresponding to the second images to be identified to form second fusion images.

Similarly, in the embodiment, fusing the modified images matched with the second images to be identified and other frame images corresponding to the second images to be identified specifically means merging the modified images matched with the second images to be identified and other frame images corresponding to the second images to be identified according to the second positioning results, and setting the modified images matched with the second images to be identified as top layer images.

In step 408, the first fusion image, the second fusion images and the video frames which are not fused in the preset number of video frames are spliced according to the respective generation time of the preset number of video frames to generate a new video stream.

In the embodiment, after all the video frames including the modifiable images are modified, the splicing sequence of the fused images and the un-fused video is determined according to the generation time of each frame in the preset number of intercepted video frames, so as to generate a new video stream.

In step 409, a video corresponding to the new video stream is represented to a user.

In the embodiment, if the video display method formed of steps 401 to 409 is completed by a server or other devices, after the new video stream is generated, the server or other devices is required to send the new video stream to a client, so that the video corresponding to the new video stream can be represented to a user; if the video display method formed of steps 401 to 409 is completed by the mobile terminal used by the user, after the new video stream is generated, the mobile terminal may directly play the video corresponding to the new video stream.

The embodiment of the present disclosure provides a video display method, which includes the steps of firstly determining whether intercepted video frames contain modifiable images according to the first positioning result and the second positioning results obtained in the above embodiments, then modifying the modifiable images to obtain a new video stream, and finally representing a video corresponding to the new video stream to a user. The method solves the technical defects of large computation amount and large time consumption of the method of performing object identification, tracking and modification on the video stream in the related art to obtain the modified image corresponding to the video stream, realizes the fast and accurate modification on the object in the video stream, reduces the time difference between generation of the video stream and watching the video by a user, and makes the interaction between the broadcast anchor and the user more timely and effective.

Embodiment 5

Figure 5:
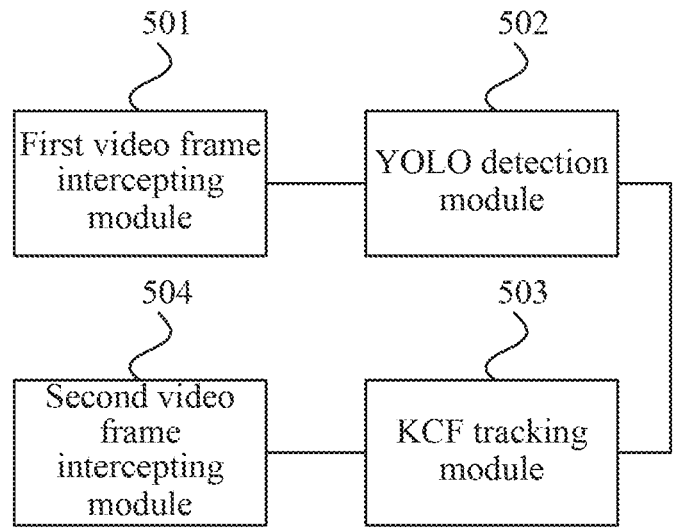
FIG. 5 is a structural diagram of an object positioning apparatus according to embodiment 5 of the present disclosure.

FIG. 5 is a structural diagram of an object positioning apparatus according to embodiment 5 of the present disclosure. As shown in FIG. 5, the apparatus includes: a first video frame intercepting module 501, a YOLO detection module 502, a KCF tracking module 503, and a second video frame intercepting module 504.

The first video frame intercepting module 501 is configured to continuously intercept a preset number of video frames in a video stream to be detected.

The YOLO detection module is configured to detect a first frame image in the intercepted video frames by a YOLO object detection method to obtain a first positioning result corresponding to the first frame image.

The KCF tracking module 503 is configured to detect each of other frame images in the intercepted video frames by a KCF object tracking method according to a positioning result corresponding to a frame image prior to the each of the other frame images to obtain respective second positioning results corresponding to the other frame images.

The second video frame intercepting module 504 is configured to keep on continuously intercepting the preset number of video frames in the video stream to be detected to obtain corresponding positioning results until the video stream to be detected is finished.

The embodiment of the disclosure provides an object positioning apparatus, in which a first video frame intercepting module 501 continuously intercepts a preset number of video frames in a video stream to be detected, then a YOLO detection module 502 detects a first frame image in the intercepted video frames by a YOLO object detection method to obtain a first positioning result corresponding to the first frame image, and a KCF tracking module 503 detects other frame image in the intercepted video frames by a KCF object tracking method according to a positioning result corresponding to a frame image prior to the each of the other frame images to obtain respective second positioning results corresponding to the other frame images, and finally a second video frame intercepting module 504 continuously intercepts the preset number of video frames in the video stream to be detected to obtain corresponding positioning results until the video stream to be detected is finished.

The apparatus solves the large computation amount and large time consumption of the object identification and tracking method for video stream in the related art, achieves fast and accurate object identification and tracking of the video stream, and greatly reduces the computation amount and time consuming of object identification and tracking of the video stream. When the number of layers of the neural network used by the YOLO object detection method is sufficiently small, the object detection method in the present embodiment may be implemented on the mobile terminal, which fills the vacancy in the related art that there is no object identification and tracking of video streams applicable to mobile terminal.

Based on the above embodiments, the apparatus may further include a first image intercepting module, a first classification result obtaining module, a first classification result determination module, an image deletion module, an image determination module, a returning and first positioning result obtaining module and a video frame continuous intercepting module.

The first image intercepting module is configured to, before detecting each of other frame images in the intercepted video frames, intercept a first image from the first frame image according to the first positioning result by a KCF object tracking method according to a positioning result corresponding to a frame image prior to the each of the other frame images to obtain respective second positioning results corresponding to the other frame images.

The first classification result obtaining module is configured to obtain a first classification result corresponding to the first image by using the Cifar classification method.

The first classification result determination module is configured to determine whether a category corresponding to the first positioning result is the same as the first classification result.

The image deletion module is configured to delete the first frame image based on the determination result that the category corresponding to the first positioning result is different from the first classification result.

The image determination module is configured to determine whether a last frame image in the intercepted video frames is a last image of the video stream to be detected.

The returning and first positioning result obtaining module is configured to return to the step of detecting the first frame image in the intercepted video frames by using a YOLO object detection method based on a determination result that the last frame image in the intercepted video frames is the last frame image of the video stream to be detected to obtain the first positioning result corresponding to the first frame image.

The video frame continuous intercepting module is configured to keep on continuously intercepting a video frame from the video stream to be detected based on a determination result that the last frame image in the intercepted video frames is not the last frame image of the video stream to be detected, and returning to the step of detecting the first frame image in the intercepted video frame by using a YOLO object detection method to obtain the first positioning result corresponding to the first frame image.

Based on the above embodiments, the apparatus may further include a preset number determination module.

The preset number determination module is configured to determine the preset number according to the image frame rate of the video stream to be detected and the data processing performance parameter of the current device before continuously intercepting the preset number of video frames in the video stream to be detected.

On the basis of the above embodiments, the preset number determination module may be specifically configured to: when determining the preset number according to the image frame rate of the video stream to be detected and the data processing performance parameter of the current device, determine a check interval N (in the following steps of the embodiment, the check interval is denoted by N) according to the image frame rate of the video stream to be detected and the data processing performance parameter of the current device, where N is less than or equal to the preset number.

Accordingly, the KCF tracking module 503 may include a second positioning result determination unit, a second image intercepting unit, a second classification result determination module, a second classification result judging module, an image deletion unit, and a second positioning result continuous determination unit.

The second positioning result determination unit is configured to obtain the respective second positioning result corresponding to the each frame image from the second frame image to the Nth frame image in the intercepted video frames by the KCF object tracking method according to the positioning result corresponding to the frame image prior to the each frame image.

The second image intercepting unit is configured to intercept the second image from the Nth frame image according to the second positioning result corresponding to the Nth frame image.

The second classification result determination module is configured to obtain the second classification result corresponding to the second image by using the Cifar classification method.

The second classification result judging module is configured to determine whether a category corresponding to the second positioning result corresponding to the Nth frame image is the same as the second classification result.

The image deletion unit is configured to delete all frame images from the first frame image to the Nth frame image based on a determination result that the category corresponding to the second positioning result corresponding to the Nth frame image is different from the second classification result, and keeping on continuously intercepting N video frames in the video stream to be detected, and returns to the step of detecting the first frame image in the intercepted video frames by the YOLO object detection method to obtain the first positioning result corresponding to the first frame image until the video stream to be detected is finished.

The second positioning result continuous determination unit configured to keep on detecting the each of the at least one frame image after the Nth frame image in the intercepted video frame by the KCF object tracking method according to the positioning result corresponding to the frame image prior to the each of the at least one frame image to obtain the respective second positioning results corresponding to each frame image after the Nth frame image based on a determination result that the category corresponding to the second positioning result corresponding to the Nth frame image is the same as the second classification result.

On the basis of the above embodiments, the preset number determination module may be specifically configured to: when a preset set number (namely the preset number) and N (namely the check interval) are determined according to the image frame rate of the video stream to be detected and the data processing performance parameter of the current device, determine the total number of checks according to the image frame rate of the video stream to be detected and the data processing performance parameter of the current device, where the product of the N and the total number of checks is less than or equal to the preset number.

Correspondingly, the second positioning result determination unit may specifically be configured to: obtain the respective second positioning result corresponding to the each frame image from the second frame image to the Nth frame image in the intercepted video frames by the KCF object tracking method according to the positioning result corresponding to the frame image prior to the each frame image, use the Nth frame image as a current image, and set a current number of checks to 0.

Correspondingly, the second image intercepting unit may specifically be configured to: intercept a second image from the current image according to the second positioning result corresponding to the current image, and update the current number of checks with a value obtained by adding 1 to the current number of checks.

Correspondingly, the second positioning result continuous determination unit may include a check number determination subunit, a second positioning result determination subunit, a step execution subunit, a second positioning result continuous obtaining subunit, and a step returning subunit.

The check number determination subunit is configured to determine whether the current number of checks is equal to the total number of checks based on the determination result that the category corresponding to the second positioning result corresponding to the current image is the same as the second classification result.

The second positioning result determination subunit is configured to determine whether the second positioning results corresponding to all the intercepted video frames are obtained based on the determination result that the current number of checks is equal to the total number of checks.

The step execution subunit is configured to execute the step of keeping on continuously intercepting the preset number of video frames in the video stream to be detected to obtain corresponding positioning results until the video stream to be detected is finished based on a determination result that the second positioning results corresponding to all the intercepted video frames are obtained.

The second positioning result continuous obtaining subunit is configured to obtain respective second positioning results corresponding to the intercepted video frames after the current image by the KCF object tracking method based on a determination result that the second positioning results corresponding to all the intercepted video frames are not obtained.

The step returning subunit is configured to obtain a second positioning result corresponding to each of intercepted N video frames after the current image by a KCF object tracking method according to the positioning result corresponding to a frame image prior to the each of the intercepted N video frames based on a determination result that the current number of checks is smaller than the total number of checks, setting the Nth frame image after the current image as the current image, return to the step of intercepting the second image from the current image according to the second positioning result corresponding to the current image, and update the current number of checks with a value obtained by adding 1 to the current number of checks.

Based on the above embodiments, the first video frame interception module 501 may be specifically configured to: continuously intercept the preset number of video frames in the video stream to be detected from the first frame image of the video stream to be detected.

Based on the above embodiments, the neural network used by the YOLO object detection method may be a 5-layer neural network.

The object positioning apparatus provided by the embodiment of the present disclosure can be used to execute the object positioning method provided by any embodiment herein, having corresponding function modules and achieving the same beneficial effect.

Embodiment 6

Figure 6:
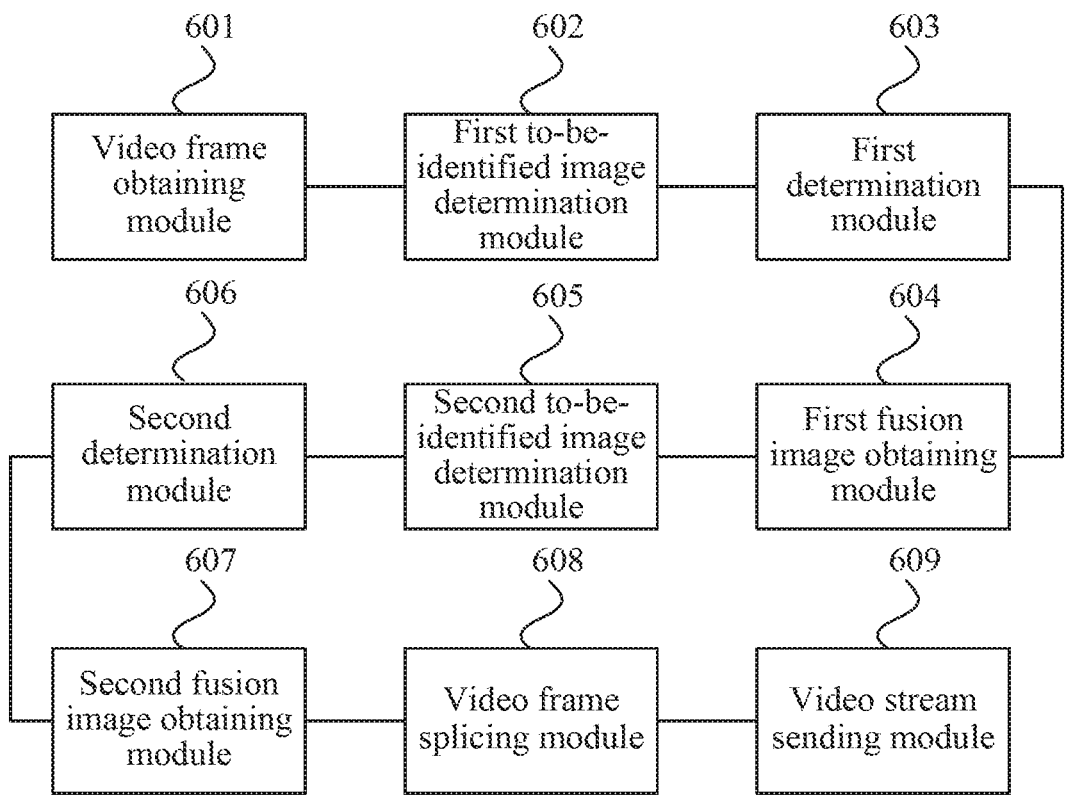
FIG. 6 is a structural diagram of a video display apparatus according to embodiment 6 of the present disclosure.

FIG. 6 is a structural diagram of a video display apparatus according to embodiment 6 of the present disclosure. As shown in FIG. 6, the apparatus includes: a video frame obtaining module 601, a first to-be-identified image determination module 602, a first determination module 603, a first fusion image obtaining module 604, a second to-be-identified image determination module 605, a second determination module 606, a second fusion image obtaining module 607, a video frame splicing module 608, and a video stream sending module 609.

The video frame obtaining module 601 is configured to continuously intercept a preset number of video frames in a video stream to be detected.

The first to-be-identified image determination module 602 is configured to determine a first image to be identified corresponding to the first frame image according to the first positioning result corresponding to the first frame image in the intercepted video frames obtained from the above embodiments.

The first determination module 603 is configured to determine whether the first image to be identified is a modifiable image.

The first fusion image obtaining module 604 is configured to fuse a modified image matched with the first image to be identified and the first frame image to form a first fusion image according to the first positioning result based on the determination result that the first image to be identified is a modifiable image.

The second to-be-identified image determination module 605 is configured to determine respective second images to be identified corresponding to other frame images in the intercepted video frame according to respective second positioning results corresponding to the other frame images obtained from the above embodiments.

The second determination module 606 is configured to determine whether the second image to be identified is the modifiable image.

The second fusion image obtaining module 607 is configured to fuse modified images matched with the second images to be identified and the other frame images corresponding to the second images to be identified to form second fusion images according to the second positioning results based on a determination result that the second image to be identified is modifiable images.

The video splicing module 608 is configured to splice the first fusion image, the second fusion images and the video frames which are not fused in the preset number of video frames according to the respective generation time of the preset number of video frames to generate a new video stream.

The video stream representing module 609 is configured to present a video corresponding to the new video stream to a user.

The embodiment of the present disclosure provides a video display apparatus. The apparatus uses the video frame obtaining module 601, the first to-be-identified image determination module 602, the first determination module 603, the first fusion image obtaining module 604, the second to-be-identified image determination module 605, the second determination module 606, the second fusion image obtaining module 607, the video frame splicing module 608, and the video stream sending module 609 to first determine whether the intercepted video frame contains a modifiable image based on the first and second positioning results obtained in the above embodiments, and then modify the modifiable image to get a new video stream, and finally represent the video corresponding to the new video stream to a user.

The apparatus solves the technical defects of large computation amount and large time consumption in the method of performing object identification, tracking and modification on the video stream in the related art to obtain the modified image corresponding to the video stream, realizes the rapid and accurate modification on the object in the video stream, reduces the time difference between the generation of the video stream and the watching of the video by a user, and leads the interaction between the anchor and the user to be more timely and effective.

Embodiment 7

Figure 7:
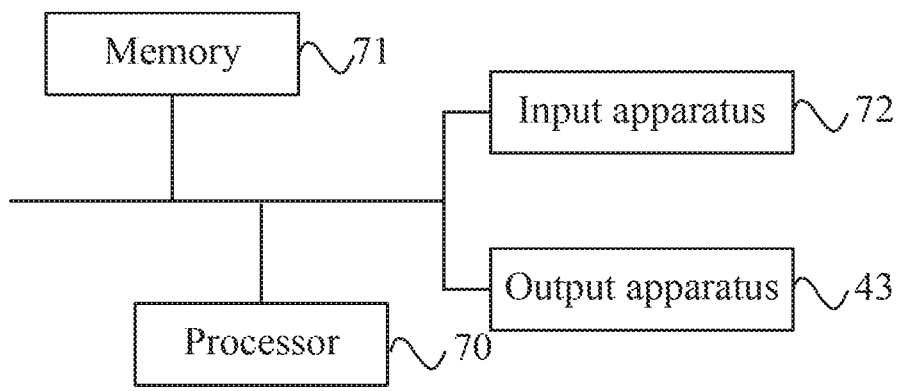
FIG. 7 is a structural diagram of a device according to embodiment 7 of the present disclosure.

FIG. 7 is a structural diagram of a device 7 according to embodiment 7 of the present disclosure. As shown in FIG. 7, the device 7 includes a processor 70, a memory 71, an input apparatus 72, and an output apparatus 73; the number of the processor 70 in the device 7 may be one or more, one processor 70 is taken as an example in FIG. 7; the processor 70, the memory 71, the input device 72 and the output device 73 in the device 7 may be connected by a bus or other means, and in FIG. 7 the connection by the bus is taken as an example.

The memory 71 is a computer-readable storage medium that can be used to store software programs, computer executable programs, and modules, such as the 7 modules corresponding to the theme update method in the embodiments of the present disclosure (for example, the first video frame intercepting module 501, the YOLO detection module 502, the KCF tracking module 503, and the second video frame intercepting module 504 in the object positioning apparatus). The processor 70 runs the software programs, instructions and modules stored in the storage 71 to execute all function applications and data processing of the device, that is, to implement the object positioning method described above.

The storage 71 may include a program storage region and a data storage region. The program storage region may store an operating system and an application program required by at least one function; the data storage region may store data created depending on use of a terminal. In addition, the storage 71 may include a high speed random access memory, and may also include a nonvolatile memory, such as at least one magnetic disk storage device, a flash device or other nonvolatile solid state storage devices. In some examples, the storage 71 may further include memory remotely located relative to the processor 70, and the memory may be connected to the device over a network. Examples of the preceding network include, but are not limited to, the Internet, an intranet, a local area network, a mobile communication network and a combination thereof.

The input apparatus 72 may be configured to receive inputted digital or character information and to generate key signal input related to user settings and function control of the device. The output apparatus 73 may include a display device such as a display screen.

Embodiment 8

Embodiment 8 of the present disclosure also provides a storage medium containing computer-executable instructions. When executed by a computer processor, the instructions are used to perform an object positioning method. The method includes the following steps.

A preset number of video frames in a video stream to be detected are continuously intercepted.

A first frame image in the intercepted video frames is detected by the YOLO object detection method to obtain a first positioning result corresponding to the first frame image.

Each of other frame images in the intercepted video frames is detected by a KCF object tracking method according to a positioning result corresponding to a frame image prior to the each of the other frame images to obtain respective second positioning results corresponding to the other frame images.

The preset number of video frames in the video stream to be detected are continuously intercepted to obtain corresponding positioning results until the video stream to be detected is finished.

Of course, the storage medium containing computer-executable instructions provided by an embodiment of the present disclosure is not limited to the method operations described above, and can also execute related operations in the object positioning method provided by any embodiment of the present disclosure.

From the above description of the embodiment, it will be apparent to those skilled in the art that the present disclosure may be implemented by software plus a necessary general-purpose hardware, or may of course be implemented by hardware. However, in many cases, the former is a more common implementation mode. Based on such understanding, the present disclosure may be embodied in the form of a software product in essence or part of contributions to related technologies. The computer software product is stored in a computer readable storage medium such as a computer floppy disk, a read-only memory (ROM), a random access memory (RAM), a flash, a magnetic disk or an optical disk and includes multiple instructions for enabling a computer device (which may be a personal computer, a server, or a network device) to execute the method described according to one or more embodiments of the present disclosure.

It is worth noting that in the above embodiment of the object positioning apparatus, the included multiple units and modules are only divided according to the function logic, but are not limited to the above division, as long as the corresponding functions are achieved; in addition, the specific name of each functional unit is only for the purpose of distinguishing each other, and is not used to limit the protection scope of the present disclosure.

Embodiment 9

Figure 8:
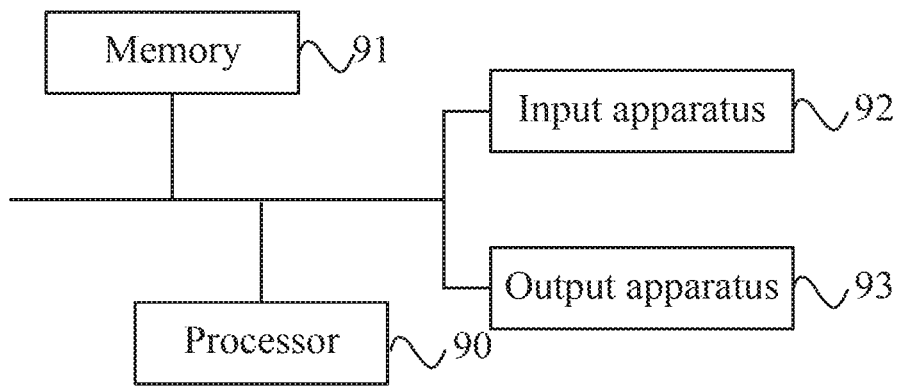
FIG. 8 is a structural diagram of a device according to embodiment 9 of the present disclosure.

FIG. 8 is a structural diagram of a device provided in embodiment 9 of the present disclosure. As shown in FIG. 8, the device includes a processor 90, a memory 91, an input apparatus 92, and an output apparatus 93; the number of the processor 90 in the device may be one or more, one processor 90 is taken as an example in FIG. 8; the processor 90, the memory 91, the input device 92 and the output device 93 in the device may be connected by a bus or other means, and in FIG. 8 the connection by the bus is taken as an example.

The memory 91 is a computer-readable storage medium that can be used to store software programs, computer executable programs, and modules, such as modules corresponding to the object positioning method in the embodiments of the present disclosure (for example, the video frame obtaining module 601, the first to-be-identified image determination module 602, the first determination module 603, the first fusion image obtaining module 604, the second to-be-identified image determination module 605, the second determination module 606, the second fusion image obtaining module 607, the video frame splicing module 608, and the video stream representing module 609 in the object positioning apparatus). The processor 90 runs the software programs, instructions and modules stored in the storage 91 to execute all function applications and data processing of the device, that is, to implement the object positioning method described above.

The storage 91 may include a program storage region and a data storage region. The program storage region may store an operating system and an application program required by at least one function; the data storage region may store data created depending on use of a terminal. In addition, the storage 91 may include a high speed random access memory, and may also include a nonvolatile memory, such as at least one magnetic disk storage device, a flash device or another nonvolatile solid state storage device. In some examples, the storage 91 may further include memory remotely located relative to the processor 90, and the memory may be connected to the device over a network. Examples of the preceding network include, but are not limited to, the Internet, an intranet, a local area network, a mobile communication network and a combination thereof.

The input apparatus 92 may be configured to receive inputted digital or character information and to generate key signal input related to user settings and function control of the device. The output apparatus 93 may include a display device such as a display screen.

Embodiment 10

Embodiment 10 of the present disclosure also provides a storage medium containing computer-executable instructions. When executed by a computer processor, the computer-executable instructions are used to perform a video display method. The method includes the following steps.

A preset number of video frames in a video stream to be detected are continuously intercepted.

A first image to be identified corresponding to a first frame image is determined according to the first positioning result corresponding to the first frame image in the intercepted video frames obtained from the above embodiments.

It is determined whether the first image to be identified is a modifiable image.

A modified image matched with the first image to be identified is fused with the first frame image to form a first fusion image according to the first positioning result based on a determination result that the first image to be identified is a modifiable image.

Respective second images to be identified corresponding to other frame images are determined according to the respective second positioning results corresponding to other frame images in the intercepted video frames obtained from the above embodiments.

It is determined whether the second image to be identified is a modifiable image.

Based on a determination result that the second image to be identified is a modifiable image; according to the second positioning result, the modified image matched with the second image to be identified is fused with other frame image corresponding to the second image to be identified to form a second fusion image.

The first fusion image, the second fusion images and the video frames which are not fused in the preset number of video frames are spliced according to the respective generation time of the preset number of video frames to generate a new video stream.

A video corresponding to the new video stream is represented to a user.

Of course, a storage medium containing computer-executable instructions provided by an embodiment of the present disclosure is not limited to the method operations described above, and can also execute related operations in the video display method provided by any embodiment of the present disclosure.

The embodiments of the present disclosure provide an object positioning method, a video display method, an apparatus, a device, and a storage medium. By simultaneously using the YOLO object detection method and the KCF (Kernel Correlation Filter) object tracking method to obtain the positioning result of each frame image in the video stream, identify the modifiable image according to the positioning result, use the matching modified image to modify the image corresponding to the modifiable image, and finally represent the modify video stream to the user, the method solves the large computation amount and large time consumption of the object identification and tracking method for video stream in the related art, achieves fast and accurate object identification and tracking of the video stream, on this basis, further solves the large computation amount and large time consumption of the method of performing object identification, tracking and modification to obtain the modified image corresponding to the video stream of the video stream in the related art, achieves fast and accurate object modification of the video stream, and reduces the time difference between the generation of the video stream and the watching of the video by a user, and leads the interaction between the anchor and the user to be more timely and effective.

From the description of the embodiment described above, it will be apparent to those skilled in the art that the present disclosure may be implemented by software plus a necessary general-purpose hardware, or may of course be implemented by hardware. However, in many cases, the former is a more common implementation mode. Based on such understanding, the present disclosure may be embodied in the form of a software product in essence or part of contributions to related technologies. The computer software product is stored in a computer readable storage medium such as a computer floppy disk, a read-only memory (ROM), a random access memory (RAM), a flash, a magnetic disk or an optical disk and includes multiple instructions for enabling a computer device (which may be a personal computer, a server, or a network device) to execute the method described according to one or more embodiments of the present disclosure.

It is worth noting that in the above embodiment of the video display apparatus, the included multiple units and modules are only divided according to the function logic, but are not limited to the above division, as long as the corresponding functions are achieved; in addition, the specific name of each functional unit is only for the purpose of distinguishing each other, and is not used to limit the protection scope of the present disclosure.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. An object positioning method, comprising:
    continuously intercepting a preset number of video frames in a video stream to be detected;
    detecting a first frame image in the intercepted video frames by a You Only Look Once (YOLO) object detection method to obtain a first positioning result corresponding to the first frame image;
    detecting each of other frame images in the intercepted video frames by a Kernel Correlation Filter (KCF) object tracking method according to a positioning result corresponding to a frame image prior to the each of the other frame images to obtain respective second positioning results corresponding to the other frame images; and
    keeping on continuously intercepting the preset number of video frames in the video stream to be detected and obtaining corresponding positioning results until the video stream to be detected is finished;
    wherein before detecting the each of the other frame images in the intercepted video frames by a KCF object tracking method according to the positioning result corresponding to the frame image prior to the each of the other frame images to obtain respective second positioning results corresponding to the other frame images, the method further comprises:
    intercepting a first image from the first frame image according to the first positioning result;
    obtaining a first classification result corresponding to the first image by using a Cifar classification method;
    determining whether a category corresponding to the first positioning result is the same as the first classification result;
    in response to determining that the category corresponding to the first positioning result is different from the first classification result, deleting the first frame image;
    determining whether a last frame image in the intercepted video frames is a last image of the video stream to be detected;
    in response to determining that the last frame image in the intercepted video frames is the last frame image of the video stream to be detected, directly returning to the step of detecting the first frame image in the intercepted video frames by using a YOLO object detection method to obtain the first positioning result corresponding to the first frame image; and
    in response to determining that the last frame image in the intercepted video frames is not the last frame image of the video stream to be detected, keeping on continuously intercepting a video frame from the video stream to be detected, and returning to the step of detecting the first frame image in the intercepted video frame by using a YOLO object detection method to obtain the first positioning result corresponding to the first frame image.

2. The method of claim 1, wherein before continuously intercepting the preset number of video frames in the video stream to be detected, the method further comprises:
    determining the preset number according to an image frame rate of the video stream to be detected and a data processing performance parameter of a current device.

3. The method of claim 2, wherein in a case of determining the preset number according to the image frame rate of the video stream to be detected and the data processing performance parameter of the current device, the method further comprises: determining an check interval N according to the image frame rate of the video stream to be detected and the data processing performance parameter of the current device, wherein N is less than or equal to the preset number;
    wherein detecting the each of the other frame images in the intercepted video frames by a KCF object tracking method according to the positioning result corresponding to the frame image prior to the each of the other frame images to obtain the respective second positioning results corresponding to the other frame images comprises:
    obtaining a respective second positioning result corresponding to each frame image from a second frame image to an Nth frame image in the intercepted video frames by the KCF object tracking method according to a positioning result corresponding to a frame image prior to the each frame image;
    intercepting a second image from the Nth frame image according to the second positioning result corresponding to the Nth frame image;
    obtaining a second classification result corresponding to the second image by using the Cifar classification method;
    determining whether a category corresponding to the second positioning result corresponding to the Nth frame image is the same as the first classification result;
    in response to determining that the category corresponding to the second positioning result corresponding to the Nth frame image is different from the second classification result, deleting all frame images from the first frame image to the Nth frame image, and keeping on continuously intercepting N video frames in the video stream to be detected, and returning to the step of detecting the first frame image in the intercepted video frames by the YOLO object detection method to obtain the first positioning result corresponding to the first frame image until the video stream to be detected is finished; and
    in response to determining that the category corresponding to the second positioning result corresponding to the Nth frame image is the same as the second classification result, keeping on detecting each of at least one frame image after the Nth frame image in the intercepted video frame by the KCF object tracking method according to a positioning result corresponding to a frame image prior to the each of the at least one frame image to obtain a respective second positioning result corresponding to the each of the at least one frame image after the Nth frame image.

4. The method of claim 3, wherein in a case of determining the preset number and the number N of check intervals according to the image frame rate of the video stream to be detected and the data processing performance parameter of the current device, the method further comprises:
   determining a total number of checks according to the image frame rate of the video stream to be detected and the data processing performance parameter of the current device, wherein a product of N and the total number of checks is less than or equal to the preset number;
wherein obtaining the respective second positioning result corresponding to the each frame image from the second frame image to the Nth frame image in the intercepted video frames by the KCF object tracking method according to the positioning result corresponding to the frame image prior to the each frame image comprises:
   obtaining the respective second positioning result corresponding to the each frame image from the second frame image to the Nth frame image in the intercepted video frames by the KCF object tracking method according to the positioning result corresponding to the frame image prior to the each frame image, using the Nth frame image as a current image, and setting a current number of checks to 0;
wherein intercepting the second image from the Nth frame image according to the second positioning result corresponding to the Nth frame image comprises:
   intercepting the second image from the current image according to the second positioning result corresponding to the current image, and updating the current number of checks with a value obtained by adding 1 to the current number of checks;
wherein in response to determining that the category corresponding to the second positioning result corresponding to the Nth frame image is the same as the second classification result, keeping on detecting the each of the at least one frame image after the Nth frame image in the intercepted video frame by the KCF object tracking method according to the positioning result corresponding to the frame image prior to the each of the at least one frame image to obtain the respective second positioning results corresponding to each frame image after the Nth frame image comprises:
   in response to determining that a category corresponding to the second positioning result corresponding to the current image is the same as the second classification result, determining whether the current number of checks is equal to the total number of checks;
   in response to determining that the current number of checks is equal to the total number of checks, determining whether second positioning results corresponding to all the intercepted video frames are obtained;
   in response to determining that the second positioning results corresponding to all the intercepted video frames are obtained, executing the step of keeping on continuously intercepting the preset number of video frames in the video stream to be detected to obtain corresponding positioning results until the video stream to be detected is finished; and in response to failing in obtaining the second positioning results corresponding to all the intercepted video frames, obtaining respective second positioning results corresponding to intercepted video frames after the current image by the KCF object tracking method.

5. The method of claim 4, wherein after determining whether the current number of checks is equal to the total number of checks in response to determining that the category corresponding to the second positioning result corresponding to the current image is the same as the second classification result, the method further comprises:
   in response to determining that the current number of checks is smaller than the total number of checks, obtaining a second positioning result corresponding to each of intercepted N video frames after the current image by a KCF object tracking method according to the positioning result corresponding to a frame image prior to the each of the intercepted N video frames, setting a Nth frame image after the current image as the current image, returning to the step of intercepting the second image from the current image according to the second positioning result corresponding to the current image, and updating the current number of checks with the value obtained by adding 1 to the current number of checks.

6. The method of claim 1, wherein continuously intercepting the preset number of video frames in the video stream to be detected comprises:
   continuously intercepting the preset number of video frames in the video stream to be detected from the first frame image of the video stream to be detected.

7. The method of claim 1, wherein a neural network used by the YOLO object detection method is a 5-layer neural network.

8. A video display apparatus, comprising:
   a processor and a memory storing processor-executable instructions, wherein the processor-executable instructions, when executed by the processor, cause the processor to:
   continuously intercept a preset number of video frames in a video stream to be detected;
   determine a first image to be identified corresponding to the first frame image according to the first positioning result corresponding to the first frame image in the intercepted video frames obtained from the object positioning method of claim 1;
   determine whether the first image to be identified is a modifiable image;
   fuse a modified image matched with the first image to be identified and the first frame image to form a first fusion image according to the first positioning result if the first image to be identified is a modifiable image;
   determine respective second images to be identified corresponding to the other frame images according to respective second positioning results corresponding to other frame images in the intercepted video frames obtained from the object positioning method;
   determine whether the second images to be identified are the modifiable images;
   fuse modified images matched with the second images to be identified and the other frame images corresponding to the second images to be identified to form second fusion images according to the second positioning results in response to determining that the second images to be identified are modifiable images;
   splice the first fusion image, the second fusion images, and the video frames which are not fused in the preset number of video frames according to the respective generation time of the preset number of video frames to generate a new video stream; and represent a video corresponding to the new video stream to a user.

9. A device, comprising:
at least one processor; and
a storage apparatus, which is configured to store at least one program;
wherein when executed by the processor, the program causes the processor to implement the object positioning method of claim 1.

10. A non-transitory computer-readable storage medium, comprising computer executable instructions for performing the object positioning method of claim 1 when executed by a computer processor.

11. A video display method, comprising:
continuously intercepting a preset number of video frames in a video stream to be detected;
determining, according to a first positioning result corresponding to a first frame image in the intercepted video frames obtained from an object positioning method, a first image to be identified corresponding to the first frame image;
determining whether the first image to be identified is a modifiable image;
in response to determining that the first image to be identified is the modifiable image, fusing a modified image matched with the first image to be identified and the first frame image to form a first fusion image;
determining, according to respective second positioning results corresponding to other frame images obtained from the object positioning method, respective second images to be identified corresponding to the other frame images in the intercepted video frames;
determining whether the second images to be identified are modifiable images;
in response to determining that the second images to be identified are modifiable images, fusing modified images matched with the second images to be identified and the other frame images corresponding to the second images to be identified to form second fusion images;
splicing the first fusion image, the second fusion images, and video frames which are not fused in the preset number of video frames according to the respective generation time of the preset number of video frames to generate a new video stream; and
representing a video corresponding to the new video stream to a user,
wherein the object positioning method comprises:
continuously intercepting a preset number of video frames in a video stream to be detected;
detecting a first frame image in the intercepted video frames by a You Only Look Once (YOLO) object detection method to obtain a first positioning result corresponding to the first frame image;
detecting each of other frame images in the intercepted video frames by a Kernel Correlation Filter (KCF) object tracking method according to a positioning result corresponding to a frame image prior to the each of the other frame images to obtain respective second positioning results corresponding to the other frame images; and
keeping on continuously intercepting the preset number of video frames in the video stream to be detected and obtaining corresponding positioning results until the video stream to be detected is finished;

wherein before detecting the each of the other frame images in the intercepted video frames by a KCF object tracking method according to the positioning result corresponding to the frame image prior to the each of the other frame images to obtain respective second positioning results corresponding to the other frame images, the method further comprises:
intercepting a first image from the first frame image according to the first positioning result;
obtaining a first classification result corresponding to the first image by using a Cifar classification method;
determining whether a category corresponding to the first positioning result is the same as the first classification result;
in response to determining that the category corresponding to the first positioning result is different from the first classification result, deleting the first frame image;
determining whether a last frame image in the intercepted video frames is a last image of the video stream to be detected;
in response to determining that the last frame image in the intercepted video frames is the last frame image of the video stream to be detected, directly returning to the step of detecting the first frame image in the intercepted video frames by using a YOLO object detection method to obtain the first positioning result corresponding to the first frame image; and
in response to determining that the last frame image in the intercepted video frames is not the last frame image of the video stream to be detected, keeping on continuously intercepting a video frame from the video stream to be detected, and returning to the step of detecting the first frame image in the intercepted video frame by using a YOLO object detection method to obtain the first positioning result corresponding to the first frame image.

12. A device, comprising:
at least one processor; and
a storage apparatus, which is configured to store at least one program;
wherein when executed by the processor, the program causes the processor to implement the video display method of claim 11.

13. A non-transitory computer-readable storage medium, comprising computer executable instructions for performing the video display method of claim 11 when executed by a computer processor.

14. An object positioning apparatus, comprising:
a processor and a memory storing processor-executable instructions, wherein the processor-executable instructions, when executed by the processor, cause the processor to:
continuously intercept a preset number of video frames in a video stream to be detected;
detect a first frame image in the intercepted video frames by a YOLO object detection method to obtain a first positioning result corresponding to the first frame image;
detect each of other frame images in the intercepted video frames by a KCF object tracking method according to a positioning result corresponding to a frame image prior to the each of the other frame images to obtain respective second positioning results corresponding to the other frame images; and
keep on continuously intercepting the preset number of video frames in the video stream to be detected and obtain corresponding positioning results until the video stream to be detected is finished;

wherein before detecting the each of the other frame images in the intercepted video frames by a KCF object tracking method according to the positioning result corresponding to the frame image prior to the each of the other frame images to obtain respective second positioning results corresponding to the other frame images, the processor-executable instructions, when executed by the processor, further cause the processor to:

intercepting a first image from the first frame image according to the first positioning result;

obtaining a first classification result corresponding to the first image by using a Cifar classification method;

determining whether a category corresponding to the first positioning result is the same as the first classification result;

in response to determining that the category corresponding to the first positioning result is different from the first classification result, deleting the first frame image;

determining whether a last frame image in the intercepted video frames is a last image of the video stream to be detected;

in response to determining that the last frame image in the intercepted video frames is the last frame image of the video stream to be detected, directly returning to the step of detecting the first frame image in the intercepted video frames by using a YOLO object detection method to obtain the first positioning result corresponding to the first frame image; and in response to determining that the last frame image in the intercepted video frames is not the last frame image of the video stream to be detected, keeping on continuously intercepting a video frame from the video stream to be detected, and returning to the step of detecting the first frame image in the intercepted video frame by using a YOLO object detection method to obtain the first positioning result corresponding to the first frame image.

\* \* \* \* \*